US012673787B2

(12) United States Patent
Corvaglia et al.

(10) Patent No.: US 12,673,787 B2
(45) Date of Patent: Jul. 7, 2026

(54) METHOD FOR MANUFACTURING A BOX-SHAPED STRUCTURE IN COMPOSITE MATERIAL FOR AIRCRAFTS

(71) Applicant: LEONARDO S.P.A., Rome (IT)

(72) Inventors: Stefano Giuseppe Corvaglia, Da Monteiasi a Grottaglie (IT); Nicola Gallo, Da Monteiasi a Grottaglie (IT); Moreno Cortellucci, Da Monteiasi a Grottaglie (IT); Alfredo Ricciardi, Da Monteiasi a Grottaglie (IT)

(73) Assignee: LEONARDO S.P.A. (IT)

( * ) Notice: Subject to any disclaimer, the term of this patent is extended or adjusted under 35 U.S.C. 154(b) by 68 days.

(21) Appl. No.: 18/655,792

(22) Filed: May 6, 2024

(65) Prior Publication Data

US 2024/0375789 A1    Nov. 14, 2024

(30) Foreign Application Priority Data

May 11, 2023    (IT) ........................ 102023000009465

(51) Int. Cl.
*B29C 70/42*        (2006.01)
*B64C 1/00*         (2006.01)
        (Continued)

(52) U.S. Cl.
CPC .................. *B64F 5/10* (2017.01); *B64C 1/00* (2013.01); *B64C 5/02* (2013.01); *B64C 2001/0072* (2013.01)

(58) Field of Classification Search
CPC ... B29C 70/462; B29C 70/543; B29C 70/541; B29C 70/446; B29C 70/222; B29C 70/205
See application file for complete search history.

(56) References Cited

U.S. PATENT DOCUMENTS 6,513,757 B1 *  2/2003  Amaoka ................... B64C 3/20
                                                    416/223 R
9,527,575 B2 * 12/2016  Moselage, III ....... B29C 70/347
                    (Continued)

FOREIGN PATENT DOCUMENTS

EP        1070661 A2      1/2001
EP        3093128 A1 *  11/2016   ............. B29C 70/30
EP        3871869         9/2021

OTHER PUBLICATIONS

Search Report issued in Italian Application No. 102023000009465.

*Primary Examiner* — Matthew J Daniels
(74) *Attorney, Agent, or Firm* — The Belles Group, P.C.

(57)            ABSTRACT

A method for manufacturing a box-shaped structure for aircrafts, the structure extending along a longitudinal direction between a first longitudinal end and a second longitudinal end, and comprising: a first longitudinal wall; a second longitudinal wall facing the first wall and spaced from the first wall by a non-zero amount; a plurality of spars extending longitudinally and between said first wall and second wall; and at least one reinforcing rib arranged transversal to the spars at a transversal sector interposed between the first and the second longitudinal end; each spar has a spar cavity defining a lack of material extending longitudinally from an axial coordinate, which corresponds to the transversal sector, up to the second longitudinal end, so that the reinforcing rib can be easily inserted even after the integral coupling between the first wall, the second wall and the spars without compromising the structural properties of the box-shaped structure.

14 Claims, 12 Drawing Sheets

(51) Int. Cl.
B64C 5/02 (2006.01)
B64F 5/10 (2017.01)

(56) References Cited

U.S. PATENT DOCUMENTS

| | | | |
|---|---|---|---|
| 2002/0195524 A1 | 12/2002 | Amaoka et al. | |
| 2003/0042364 A1* | 3/2003 | Tanaka | B64C 3/20 |
| | | | 244/123.2 |
| 2009/0282668 A1* | 11/2009 | Sanchez-Brunete Alvarez | |
| | | | B64C 3/18 |
| | | | 29/428 |
| 2013/0277372 A1* | 10/2013 | Waku | B32B 17/02 |
| | | | 428/221 |
| 2015/0041592 A1* | 2/2015 | Kamihara | B60K 15/03177 |
| | | | 244/135 R |
| 2015/0183506 A1* | 7/2015 | Garc a Mart n | B32B 37/1018 |
| | | | 244/129.1 |
| 2015/0343702 A1* | 12/2015 | García Martín | B64C 3/24 |
| | | | 156/349 |
| 2017/0008250 A1* | 1/2017 | Kashiwagi | B29C 70/30 |
| 2017/0334545 A1* | 11/2017 | Guinaldo Fernandez | |
| | | | B64C 1/26 |
| 2019/0016438 A1* | 1/2019 | Humfeld | B29D 99/0014 |
| 2021/0261236 A1* | 8/2021 | Corvaglia | B29C 33/485 |
| 2022/0024556 A1* | 1/2022 | Heaysman | B29C 70/865 |
| 2022/0033060 A1* | 2/2022 | Behzadpour | B64C 3/187 |
| 2022/0097820 A1 | 3/2022 | Spreadbury et al. | |
| 2022/0153438 A1* | 5/2022 | Smith | B64F 5/50 |

* cited by examiner

METHOD FOR MANUFACTURING A BOX-SHAPED STRUCTURE IN COMPOSITE MATERIAL FOR AIRCRAFTS

CROSS-REFERENCE TO RELATED APPLICATION

This patent application claims priority from Italian patent application no. 102023000009465 filed on May 11, 2023, the entire disclosure of which is incorporated herein by reference.

TECHNICAL FIELD

The invention relates to a method for manufacturing a box-shaped structure in composite material for aircraft, in particular for a horizontal stabilizer of an airplane, to which the following description will explicitly refer without losing generality.

BACKGROUND

Structural components, for example fuselages and parts thereof, made of composite material, used in the aviation field are known.

In the state of the art, there are aeronautical structural components that are produced in light alloy and, therefore, in metal material, which will then form the fuselage of the aircraft.

As known, the fuselage must provide adequate protection for the payload (crew, passengers, cargo, etc.), but at the same time not exceed the prescribed weight limits.

Furthermore, the use of metal components, in return for greater strength, leads to an increase in total costs.

Therefore, the need to manufacture structural components made of composite materials in order to reduce the overall weight of the airplanes has arisen.

In fact, the use of composite material allows to reduce the overall weight of aircraft and to obtain at the same time very strong structures.

Moreover, the use of metallic elements and their assembly in contact with the structures cause problems of galvanic coupling with related risks of corrosion of the metal and the need to increase inspection levels. This leads to an increase in total costs for the producers of these components and, therefore, for the airlines.

Therefore, the use of composite material is dictated by the need to reduce the overall weight of airplanes and to eliminate or minimize the corrosion problems of aeronautical structures and increase their fatigue strength.

As is known, the horizontal stabilizer is a structural component with fixed surfaces which is generally part of the tail portion of the fuselage of an airplane.

In particular, the stabilizer is an aerodynamic surface which has the function of precisely stabilizing the airplane along the pitch axis.

More in particular, a typical airplane comprises two horizontal stabilizers, each defined by a kind of wing, usually much smaller in size than the main wings of the airplane, extending cantilevered from the tail portion of the fuselage.

The stabilizers extend from opposite sides of the fuselage, generally along a plane substantially parallel to the plane of the wings.

In more detail, the two stabilizers are coupled at their interlocking ends to a central box-shaped element, known as a "center box" and incorporated in the end part of the fuselage.

In other words, the center box is interposed between the two stabilizers.

Each stabilizer has a box-shaped structure therein made of composite material.

In particular, such a box-shaped structure is generally monolithic and essentially comprises: an upper wall; a lower wall facing the upper wall and spaced a non-zero amount apart from the latter; and a plurality of spars extending between the upper and lower walls, defining interconnecting elements therebetween, and delimiting therebetween and with the aforesaid upper and lower walls respective elongated cavities each extending, between a front opening and a rear opening arranged on planes transversal to the walls themselves and to the spars.

As mentioned, the use of composite material allows to reduce the overall weight of the structural components, and thus of the aircraft, and to simultaneously obtain very strong structures.

The upper and lower walls are approximately parallel and more precisely slightly converging therebetween toward the front openings or toward the rear openings.

The spars consist of transverse partitions, and more in particular substantially orthogonal, to the upper and lower walls.

In particular, each spar consists of two elongated profiles generally having a C-shaped profile and including a back or flange and two wings projecting orthogonally from the opposite end edges of the flange.

According to an alternative configuration, the aforesaid profiles can have a J-shaped profile.

In order to form a spar, the two C-shaped profiles are joined together along the respective flanges so as to have opposing concavities.

The monolithic box-shaped structure described above is manufactured by means of a known method which comprises the steps indicated below starting from a prepreg with a thermosetting matrix (resin) reinforced by fibers of different nature such as carbon fibers, aramidic fibers, glass fibers, etc.

EP-A-3871869, on behalf of the same Applicant, describes a method for manufacturing the monolithic box-shaped structure for a horizontal stabilizer of an airplane as above.

More in particular, according to the method described in EP-A-3871869, the aforesaid C-shaped profiles are laminated on respective elongated and substantially parallelepiped profile forming and support tools, which are subsequently intended to hold the spars in the respective predefined positions inside the box-shaped structure being manufactured.

Each tool consists of a substantially parallelepiped elongated body, delimited by flat faces and having a cross section corresponding to the shape of the aforesaid elongated cavities of the structure to be manufactured.

In particular, each C-shaped profile is laminated onto three flat faces of the forming and support tool, preferably after application of a resin-based adhesive agent (known as a "tackifier").

A first face of the tool is completely coated with the prepreg, while two other faces of the tool adjacent to the first face, orthogonal to the latter and parallel to each other, are coated only for a stretch.

Each tool can therefore support on opposite sides two prepreg C-shaped profiles.

Depending on the composition of the tool, it may be necessary to "dress" the tool before laminating the profiles, by applying special separating films, tubular bags, ventilation fabrics.

After a consolidation under vacuum and at a predetermined temperature, the C-shaped profiles are joined two by two in the manner described above so as to form the desired number of spars.

In detail, each spar is arranged so that: the flanges of the relative pair of C-shaped profiles that constitute it are interposed between two facing flat faces of two mutually adjacent tools; and the wings of each profile rest on respective flat faces of the relative tool, parallel to each other and substantially orthogonal to the flat face that supports the flange of the profile itself.

The assembly consisting of spars and tools (and possibly further filler elements known as "noodles") is inserted into a forming mold comprising a lower plate, an upper plate and two opposing side plates connecting the lower and upper plates.

In particular, on each of the two upper and lower plates one or more layers ("plies") of prepreg composite material are laminated, which are destined to define the upper and lower skins which will constitute, after the curing step, the upper and lower walls of the box-shaped structure to be manufactured.

Once the upper and lower skins have been laminated, on the lower plate of the forming mold carrying the lower skin, the preformed spars held in position by the respective forming and support tools are positioned; subsequently, the upper plate of the forming mold carrying the upper skin is closed on the side walls of the mold itself and on the assembly constituted by the preformed spars and the tools.

At this point, a ventilation fabric and a tubular bag are stuffed inside each tool (which is hollow lengthwise).

Furthermore, known components such as separator films, ventilation fabric and a bagging film are arranged outside the mold to make what are known as front and back sealed bagging.

The ends of the adjoining tubular bags are also closed and sealed together.

At this point, the forming mold thus prepared is arranged inside an autoclave to carry out the curing operation at predetermined pressure and temperature values (e.g., for epoxy resins, the curing temperature is around 180° C. and the curing pressure is between 6 and 7 bar).

The curing pressure acts both outside the structure being formed and inside the hollow tools and thus inside the cavities of the structure itself, through the tubular bags.

Once the curing is complete, the bags and forming and support tools are removed, and the monolithic box-shaped structure is obtained consisting of the upper and lower walls (skins) and the spars arranged transversely therebetween.

Each box-shaped structure, defining a respective stabilizer, is then joined to the aforesaid center box.

There is an increasing need to reduce the total number of components and further reduce the overall weight of the airplane.

For example, the use of the center box involves a certain difficulty in assembling the two half-wings forming the horizontal stabilizers, especially in the case of small aircraft.

In accordance with the above, construction solutions have become widespread in which the center box, which is defined by a complex and relatively heavy box-shaped element, is replaced by a simple beam joint element, e.g., a relatively thin double-T profile.

For this purpose, each box-shaped structure described above must be further extended along its longitudinal direction to compensate for the lack of material resulting from the removal of the center box (since the extension of the stabilizer must regardless remain the same).

However, the elongation of the box-shaped structure involves structural criticalities within the stabilizer, particularly with regard to the structural rigidity and stability required to ensure the nominal use performance of the horizontal stabilizers.

To solve such a problem, some known solutions involve the insertion of a reinforcing rib at a given longitudinal position of the box-shaped structure (or an axial coordinate, with respect to a longitudinal axis of the box-shaped structure).

In more detail, the reinforcing rib consists of a series of transverse, and more specifically substantially orthogonal, partitions to the upper and lower walls and spars, arranged in series one after the other.

In other words, the reinforcing rib extends transversally to the longitudinal extension direction of the box-shaped structure, at a given axial coordinate thereof.

In the state of the art, the insertion of the reinforcing rib is rather complicated. According to a known solution, once the above-mentioned monolithic box-shaped structure has been completed, portions of material are removed on the skins and/or at the flanges of the spars, so as to gain access to the interior of the aforesaid cavities.

Such a procedure undoubtedly introduces complications into the stabilizer manufacturing process, as it is necessary to assemble the reinforcing rib by working in rather narrow and cramped recesses, and without the possibility of properly viewing the assembly site. Furthermore, due to the very nature of composite material in fiber, there could be possible errors in dimensional tolerances between the various components (e.g., between spars and skins).

Furthermore, the assembly process of the reinforcing rib becomes more and more complicated the smaller the size of the airplane, and therefore of the stabilizers to be manufactured.

Therefore, the Applicant has noted that the method described and the box-shaped structure obtained by means thereof are susceptible to improvement, in particular in order to strengthen the box-shaped structure while avoiding introducing excessive complications in the manufacturing process.

SUMMARY

The present invention may be directed to a method for manufacturing a box-shaped structure in composite material for an aircraft and a box-shaped structure, which are highly reliable and of limited cost and allow to satisfy at least one of the requirements specified above and connected with the methods for manufacturing box-shaped structures in composite material of known type.

BRIEF DESCRIPTION OF THE DRAWINGS

In the following, an embodiment of the invention is described for a better understanding thereof by way of a non-limiting example and with reference to the accompanying drawings, wherein.

DETAILED DESCRIPTION OF THE INVENTION

Figure 1:
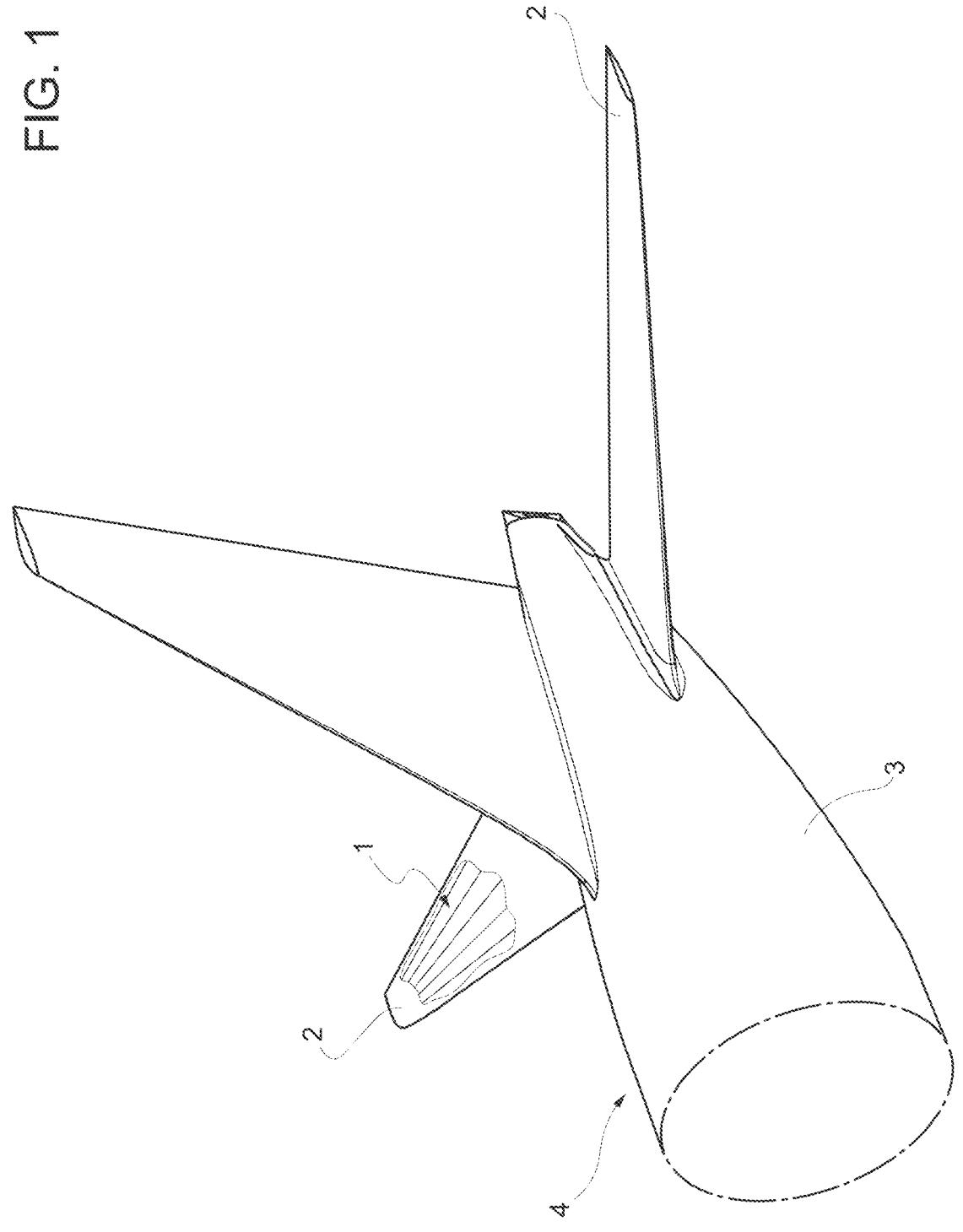
FIG. 1 is a perspective view, with parts removed for clarity, of a rear or tail part of an aircraft, the tail part comprising two horizontal stabilizers each including a box-shaped structure obtained by the manufacturing method according to the present invention.
Figure 1A:
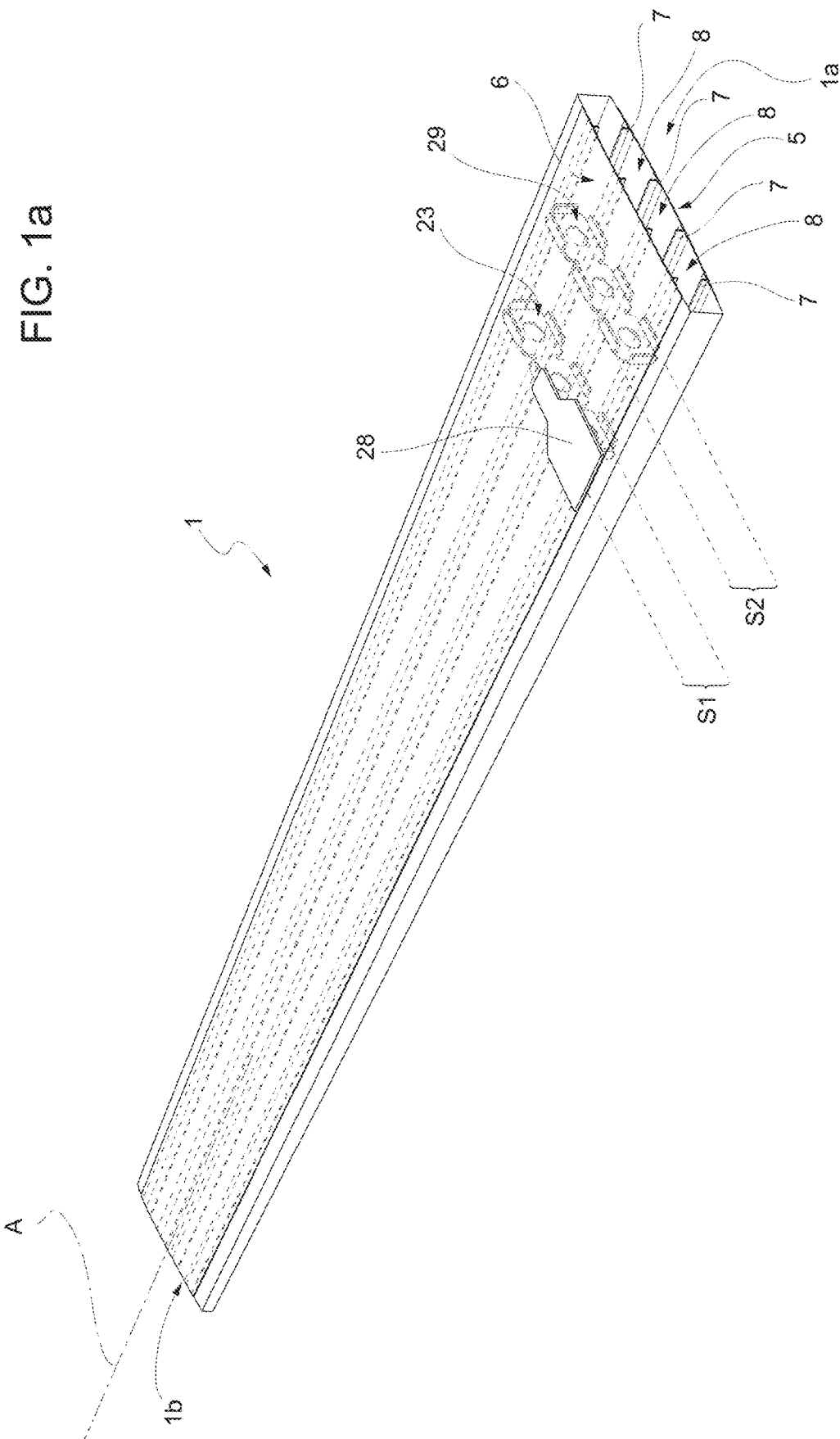
FIG. 1a illustrates in perspective view, in an enlarged scale and with parts removed for clarity, the box-shaped structure obtained by the manufacturing method in accordance with the present invention.
Figure 2:
FIG. 2 is a plan view of the tail section of FIG. 1, in which some components of the box-shaped structure are schematically visible, with parts removed for clarity.

With reference to FIGS. 1, 1a and 2, a box-shaped structure for aircraft made of composite material is collectively referred to as 1.

In particular, the structure 1 is for use in (and more precisely for manufacturing) a horizontal stabilizer 2 of a fuselage 3 of an aircraft, e.g., of an airplane 4, to which the present description will refer without thereby losing generality.

As can be seen in FIGS. 1a and 2, the structure 1 extends along a longitudinal direction A between a first longitudinal end 1a and a second longitudinal end 1b.

In the example described, the first end 1a represents a jammed end of the stabilizer 2 (i.e., jammed to the fuselage 3), while the second end 1b represents the free end of the stabilizer 2.

The structure 1 comprises: a first longitudinal wall 5, in particular a lower wall; a second longitudinal wall 6, in particular an upper wall, facing, along the surface thereof of greater extension, the surface of greater extension of the first wall 5 and arranged spaced from the latter by a non-zero amount; a plurality of interconnecting elements or spars 7 extending longitudinally and transversely between the lower 5 and upper 6 walls and delimiting therebetween and with said upper 5 and lower 6 walls a series of elongated cavities 8 each extending longitudinally between the first axial end 1a and the second axial end 1b.

The lower 5 and upper 6 walls are, in the example illustrated, approximately parallel to each other. According to a possible alternative not illustrated, the walls 5 and 6 could also be slightly convergent with each other towards the first end 1a or the second end 1b.

The spars 7 consist of partitions which are substantially orthogonal, or more in general transverse, to the lower 5 and upper 6 walls and elongated in the longitudinal direction A.

The structure 1 is made from a prepreg with a polymeric matrix, for example made of thermosetting resin, reinforced by fibers which may have different nature, such as for example carbon fibers and/or aramidic fibers and/or glass fibers, etc.

Alternatively, the structure 1 could also be made from a matrix prepreg made of thermoplastic resin reinforced by fibers of the type indicated above.

A method for manufacturing the structure 1 according to the present invention will be illustrated below.

Figure 6:
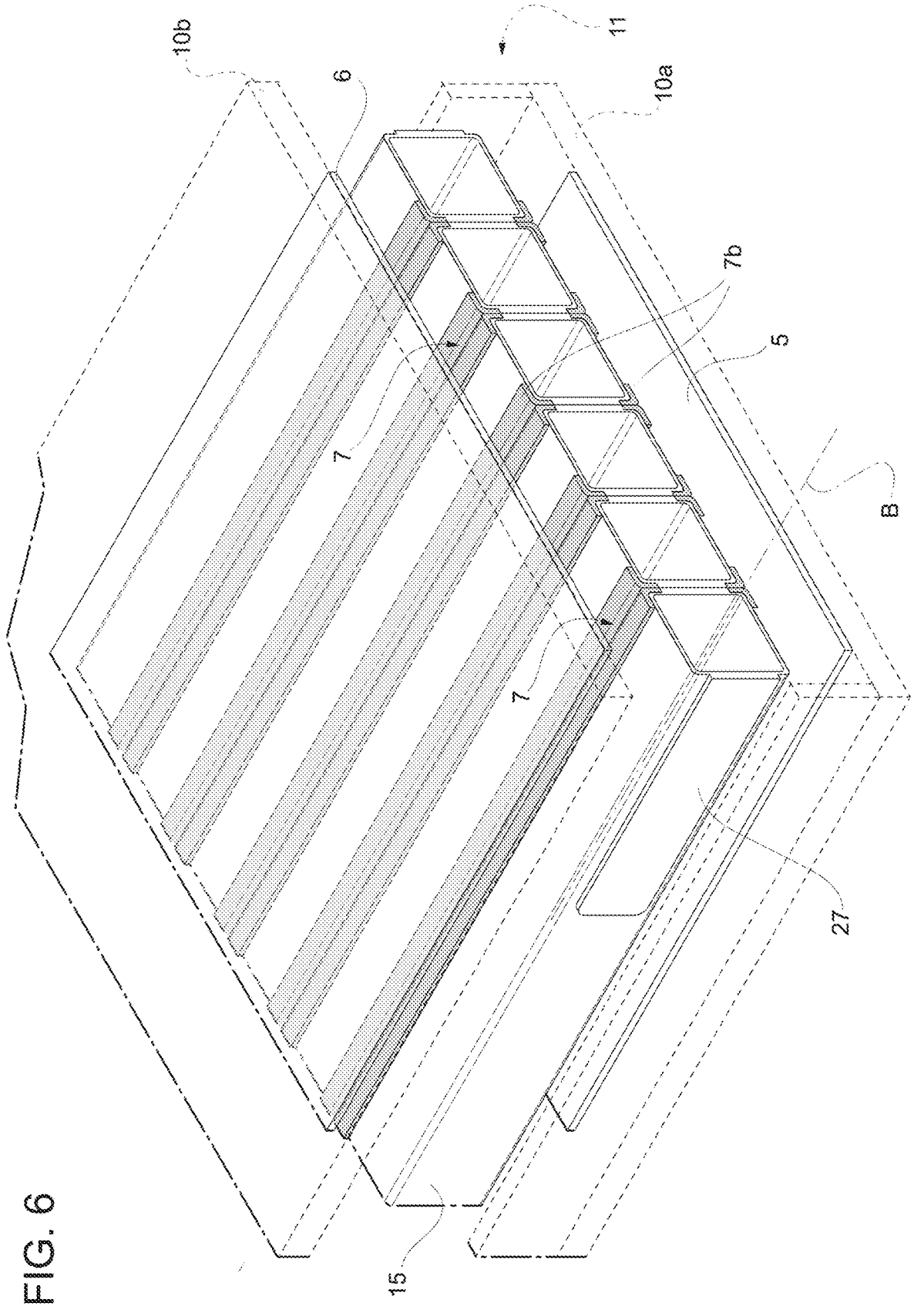
FIG. 6 is an exploded perspective view of a forming mold, which is used for manufacturing the box-shaped structure and in which, for such a purpose, a series of support tools of FIG. 3 is destined to be inserted.

With reference to FIG. 6, the first wall (i.e., bottom wall) 5 is made by laminating a first plurality of layers of said prepreg composite material on a first forming plate 10a of a forming mold 11, so as to form a first skin of composite material defining the lower wall 5.

Similarly, the second wall (i.e., upper wall) 6 is made by laminating a second plurality of layers of said prepreg composite material on a second forming plate 10b of the forming mold 11 so as to form a second skin of composite material defining the upper wall 6.

Figure 3:
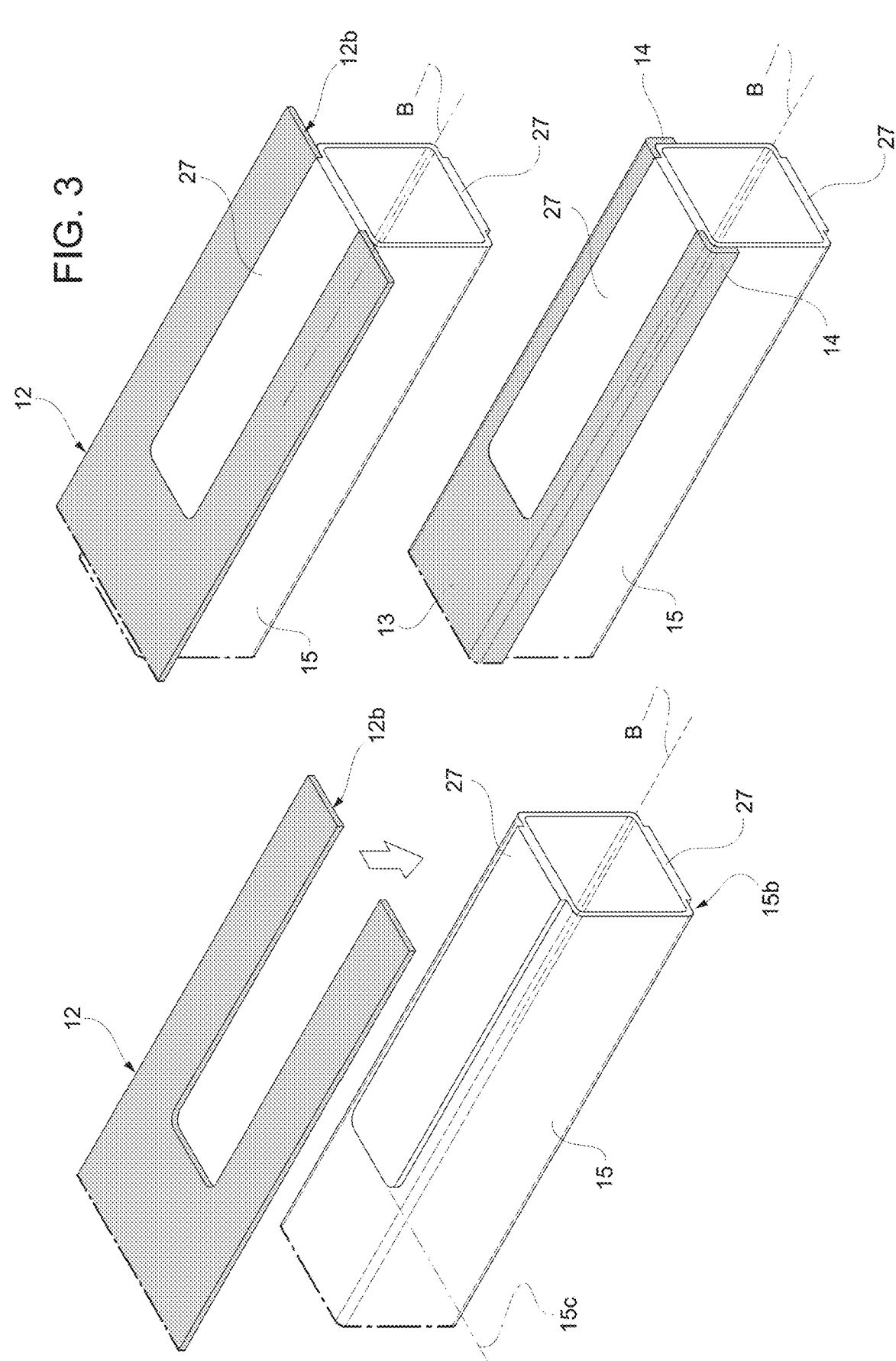
FIG. 3 illustrates in perspective view a support tool in successive steps during a lamination operation of part of a spar of the box-shaped structure.
Figure 4:
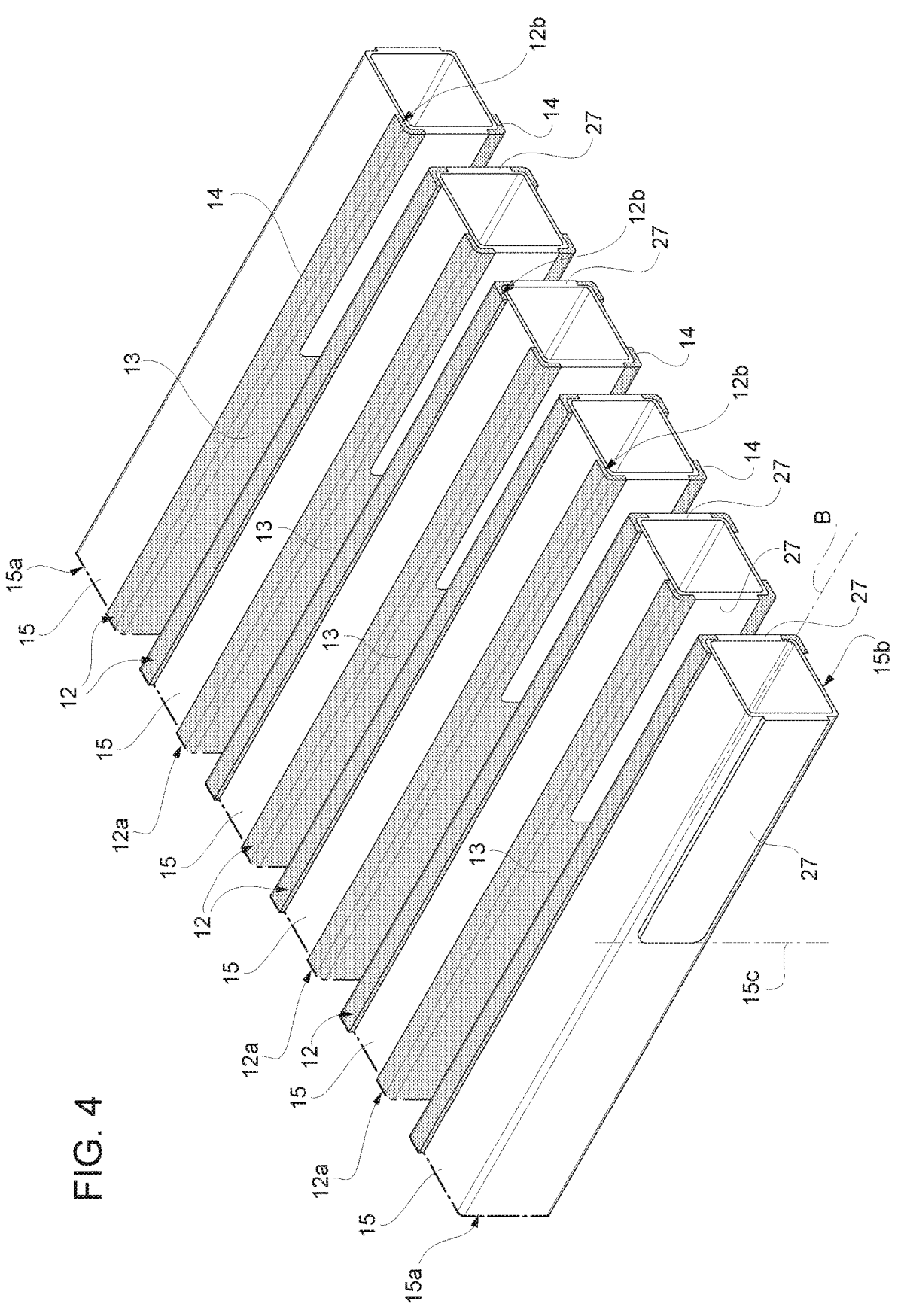
FIGS. 4 and 5 illustrate schematically, in perspective view, in an enlarged scale and with parts removed for clarity, the manufacturing of spars of the box-shaped structure.
Figure 5:
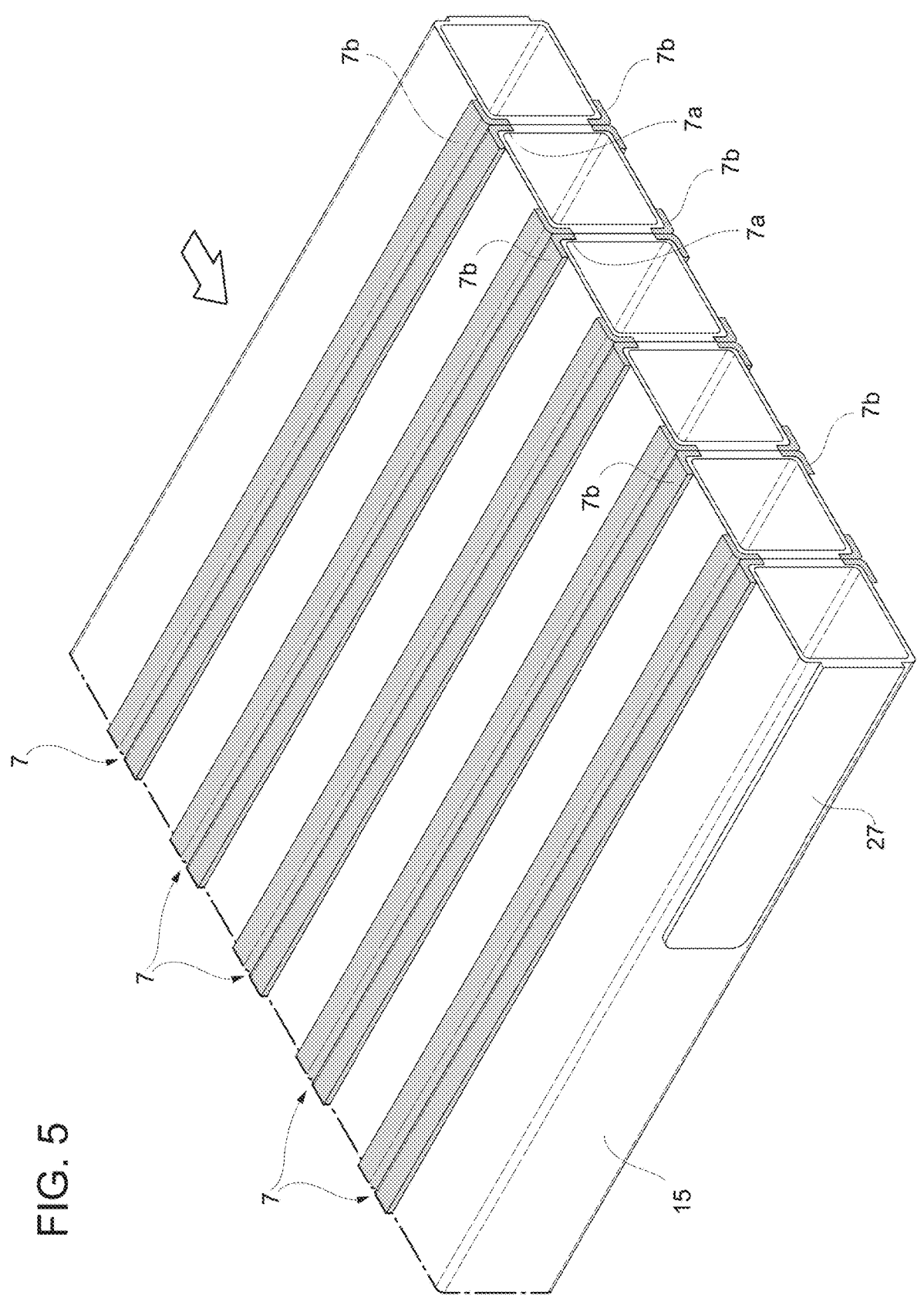

With reference to FIGS. 3, 4 and 5, the spars 7 are obtained as follows.

In detail, each spar 7 is obtained from two profiles 12 each having a longitudinal axis C (FIG. 11), longitudinally elongated, having a C-shaped cross-section and each comprising a central flange 13 and two end appendages or winglets 14 projecting transversally (and in particular substantially orthogonally) from the opposite end edges of the flange 13 itself and arranged on the same side of the latter.

Once the profiles 12 have been obtained, in order to form a spar 7, two profiles 12 are joined together along their respective flanges 13 so as to have opposite concavities (FIGS. 4 and 5).

In more detail, the profiles 12 are obtained (FIG. 3):

arranging a plurality of elongated support tools 15 each of which has a central axis B and a cross section with a polygonal external profile complementary to the profile of the cavities 8 to be formed in the structure 1 and which are subsequently intended to hold the spars 7 in the predefined positions within the structure 1 being manufactured; and respectively laminating a third plurality of layers of said prepreg composite material on three contiguous walls of each support tool 15.

It should be noted that the term "laminate" in connection with the lamination of the second plurality of layers mentioned above can comprise or refer to, in the present description: both a "direct" lamination of the layers of said second plurality on the support tool 15, and the simple arrangement of the layers of said second plurality on the support tool 15 and the subsequent folding on the aforesaid three contiguous walls, whereby the layers have already been laminated on another auxiliary tool (as in the example shown in FIG. 3).

In the example illustrated, each support tool 15 extends between two axial ends 15a and 15b has a parallelepiped shape elongated along the axis B and hollow in the same direction.

In an embodiment not illustrated, each support tool 15 could have a more complex geometry, so as to accommodate the differences in thickness which could exist within the stabilizer 2 in both the transverse and longitudinal directions.

Conveniently, the support tools 15 have a composition based on reinforcing material and polymer apt to allow the passage from a rigid state to a flexible elastomeric state and vice versa in response to heating and cooling, respectively, i.e., in response to a temperature stimulus.

The polymer constituting the support tools 15 is advantageously a thermosetting or thermoplastic polymer with shape memory of a known type. The polymer may be, for example, an epoxy polymer with shape memory, a cyanate ester polymer with shape memory, a polyurethane polymer with shape memory, a vinyl polymer with shape memory, a polyimide polymer with shape memory, a maleimide polymer with shape memory, or combinations thereof, including copolymers.

Thanks to the properties of the polymer with shape memory, the support tools 15 can recover their original rigid shape despite an extensive repeated use and after numerous heating and cooling down cycles.

The reinforcing material of the support tools 15 may include one or more elastic fibers.

In particular, the reinforcing material may also contain nylon fibers, lycra fibers, polyester fibers, carbon fibers, glass fibers, aramidic fibers, boron fibers, basalt fibers, polymer fibers, chopped fibers, meshes, three-dimensional fiber preforms, normal weft fabrics, twill fabrics, or other types of fabric and combinations thereof. A suitable commercial example of nylon fibers is the nylon produced by Invista (Wichita, Kans.).

The support tools 15, in some embodiments, may contain two or more different types of reinforcing materials.

Each profile 12 is then laminated (where "laminated" can be understood to mean as specified above) externally onto three contiguous walls of the relative support tool 15 in the rigid state, preferably after application of a resin-based adhesive agent (known as "tackifier"). Each support tool 15 can thus support on opposite sides two prepreg C-shaped profiles 12 (FIG. 4).

After lamination, a compacting of the profiles 12 is carried out as described in EP-A-3871869.

Once the compaction is complete, in order to form the spars 7, the profiles 12 are joined two by two along the respective flanges 13 adjoining them side by side or next to each other with the respective pairs of support tools 15 (FIG. 5) so that the profiles 12 themselves have opposite concavities. The spars 7 are then held at the desired distance from each other by means of the support tools 15.

The spars 7 thus obtained therefore have a double-T cross section defined by a central web 7a and two opposite end wings 7b (one lower and one upper).

In detail, each web 7a is defined by the union of two flanges 13, and each wing 7b is defined by the union of two winglets 14, as described above.

Any recesses or gaps in the spars 7 are filled with what are called fillers or noodles as described in EP-A-3871869 on behalf of the Applicant.

According to an alternative embodiment, the support tools 15 are defined by rigid elements, e.g., metallic, i.e., which do not allow the transition from a rigid to a flexible elastomeric state and vice versa in response to a temperature stimulus, of the type described in the introductory part of the description of EP-A-3871869.

In particular, in the latter case, each support tool consists of an elongated rigid and solid, substantially parallelepiped body having a cross section corresponding in shape to that of the elongated cavities 8 of the structure 1 to be manufactured. Before positioning each spar, still in the form of a preformed prepreg, between two support tools, the latter are subjected to a dressing operation consisting of the following successive steps: applying a layer of separating agent, for example in the form of a film, to each support tool to facilitate the subsequent extraction of the support tool itself from the respective elongated cavity; fitting on each support tool thus prepared a tubular bag leaving an excess of the latter at each end of the support tool itself for a subsequent sealing operation; wrapping on each support tool and outside the tubular bag a ventilation fabric, fixing the flaps thereof with a sealant; fitting on each support tool thus prepared a tubular separator film, leaving also in this case an excess of the latter at each end of the support tool itself for the subsequent sealing operation; sealing the ends of the tubular bag and of the tubular separator film by means of a sealant; applying the vacuum and waiting for the tubular separator film to shrink the entire dressing on the relative support tool.

The assembly thus formed, consisting of the spars 7, the support tools 15 and any further structure, support or filler element (and possibly dressing, in the case of the aforesaid alternative embodiment of the support tools 15), is inserted into the forming mold 11 (as diagrammed in FIG. 6).

In particular, the support tools 15 thus placed side by side and the previously obtained spars 7 are arranged longitudinally on the lower wall 5 already laid on the first plate 10, as shown in FIG. 6.

More in particular, the spars 7 are laid on the lower wall 5 in so that the respective first (lower) wings 7b of the spars 7 are coplanar in contact with the lower wall 5 itself and so that the webs 7a of the spars 7 are oriented along the longitudinal direction A.

Subsequently, the upper wall 6 is arranged on the previously obtained assembly so that the upper wall 6 is coplanar in contact with the respective second (upper) wings 7b of the spars 7 opposite said first wings 7b, thus delimiting the longitudinal cavities 8 and defining a first assembly 16 (FIG. 7) of the structure 1 including the lower wall 5, the upper wall 6 and the spars 7.

In the case of the aforesaid alternative embodiment in which the support tools 15 are defined by rigid elements, e.g., metal, a separator film, a ventilation fabric and a bagging film are arranged successively over the entire forming mold; the latter is sealed by means of a sealant at the base of the forming mold.

The aforesaid tubular separator film arranged on each support tool is opened at the ends; the part in excess in length with respect to the relative support tool is cut.

The aforesaid tubular bags on the respective support tools are unwound at the ends and sealed.

What is known as the "envelope bag" is thus formed, by sealing the edge of the external bag film arranged on the forming mold with the ends of the tubular bags of the support tools and also by sealing the ends of the adjoining tubular bags.

At this point the vacuum is applied inside the envelope bag until the material of the external bag is shrunk toward the external surface of the forming mold.

The ends of the tubular bags are then opened and, by continuing to apply the vacuum, the tubular bags themselves are detached from the respective support tools, tending to minimize the volume enclosed inside the envelope bag.

In accordance with the present invention, the flange 13 of each profile 12 has (FIG. 11): a first portion 17 extending from an axial end 12a of the profile 12 to a given axial coordinate (or axial position) X of the profile 12, axially interposed between said one axial end 12a and the other axial end 12b of the profile 12, the first portion 17 being substantially full (in particular seamlessly full, and more in particular having a negligible percentage of empty spaces over full spaces or regardless less than 20%) in the longitudinal direction and in the direction transverse to the longitudinal axis C and between the relative winglets 14; and a second portion 18 extending from said axial coordinate X to said other axial end 12b, said second portion 18 having a through slot 19 extending longitudinally from the axial coordinate X up to said other axial end 12b and open laterally at said other axial end 12*b* by means of a relative lateral opening 20, so as to define a lack or void of material on the relative flange 13 in the longitudinal direction, so that each spar 7 has in turn a longitudinal spar cavity 21 (FIGS. 7-10) open laterally and determined by the union of the relative slots 19.

Therefore, according to the manufacturing method in accordance with the present invention, the lamination of (i.e., the step of laminating) the third plurality of layers of prepreg composite material comprises, for each C-shaped profile 12: laminating the relative winglets 14 from one axial end 12*a* of the profile 12 to the other axial end 12*b* of the profile 12 (FIG. 3); laminating the first portion 17 from said axial end 12*a* up to the axial coordinate X; laminating the second portion 18 from the axial coordinate X to said other axial end 12*b*, the second portion 18 having the through slot 19 extending longitudinally from the axial coordinate X up to said other axial end 12*b* and open laterally at said other axial end 12*b* by means of the relative lateral opening 20, so as to define a lack or void of material on the relative flange 13 in the longitudinal direction, so that each spar 7 has in turn, on the respective web 7*a*, a longitudinal spar cavity 21 open laterally and determined by the union of the respective slots 19.

In the example described, each slot 19 has an essentially rectangular shape, with the internal vertices arranged at the rounded axial coordinate X.

Conveniently, the second portion 18 is laminated so as to have a pair of facing longitudinal ribs 22, each extending transversally (and in particular orthogonally) cantilevered from a respective winglet 14, inwards, and longitudinally from the axial coordinate X up to said other axial end.

The ribs 22 are integral parts of the flange 13 of each profile 12, spaced apart from each other by means of the slot 19.

Figure 11:
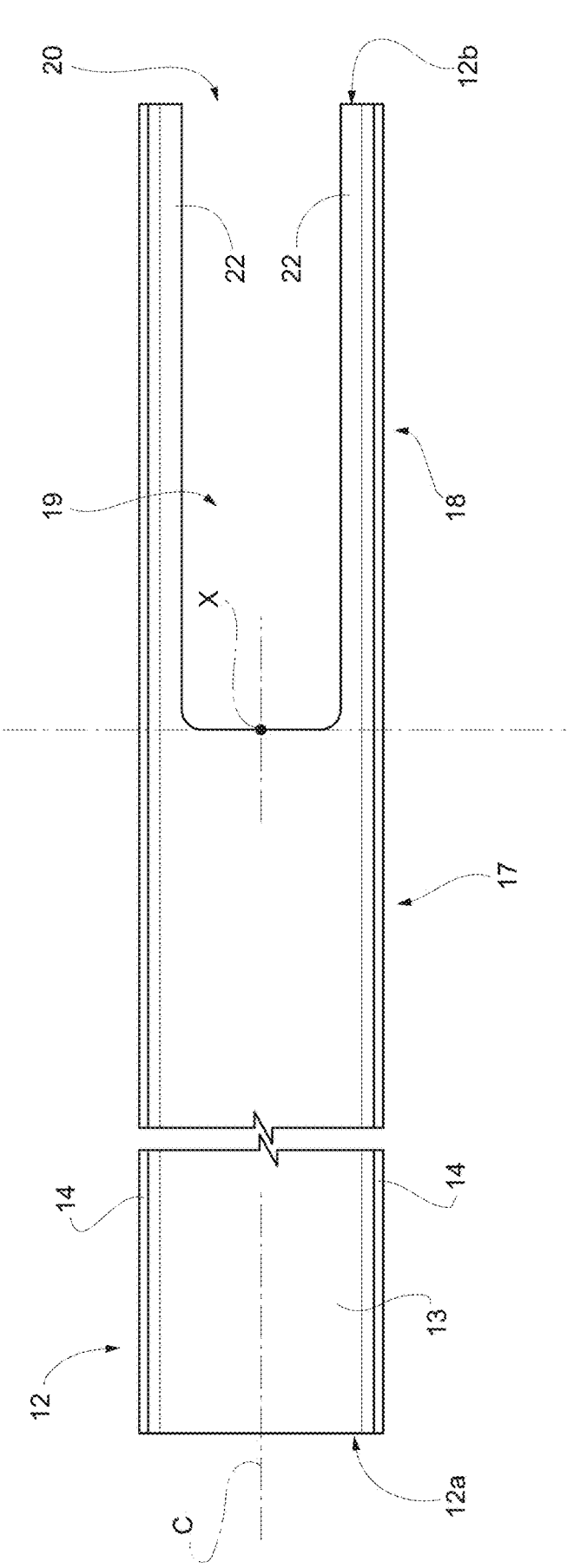
FIG. 11 is a side view, in an enlarged scale, of a C-shaped profile from which a respective spar is obtained.

The ribs 22 longitudinally delimit the relative slot 19, as shown in FIG. 11, so that each spar cavity 21 is longitudinally delimited by the respective pairs of ribs 22 joined together.

In practice, once a respective spar 7 has been made from two profiles 12, a first axial part of the spar 7 (corresponding to the union of the first portions 17 of the two profiles 12) has a double-T cross-section; a second axial part of the spar 7 (corresponding to the union of the second portions 18 of the two profiles 12) has a double-T cross-section but interrupted by the spar cavity 21. More precisely, the cross-section of the second axial part of the spar 7 has two Ts arranged mirrored with respect to each other and interspersed by the cavity 21.

Advantageously, in order to obtain the profiles 12 each having a slot 19 of the type described above, each support tool 15 includes two shaped protuberances 27 protruding from its own outer surface and extending over at least two opposite walls of the support tool 15 itself starting from a given axial coordinate 15c, axially interposed between said two axial ends 15*a* and 15*b*, up to one of said two axial ends.

Appropriately, each protuberance 27 has a shape complementary to the slot 19.

Consequently, the lamination of each profile 12 is carried out by surrounding the edge of one of said protuberances 27 so as to define said slot 19 and said ribs 22.

The ribs 22 therefore form a kind of "extension" of the structural reinforcement defined by each spar 7: in other words, each spar 7 has the spar cavity 21 defined by two side-by-side slots 19, but also has ribs 22 continuing from the point where the spar cavity 21 begins up to the opposite axial end of the spar 7 itself. Thereby, each spar 7 allows to achieve the benefits explained below while defining a valid structural support along its entire extension.

The structure 1 according to the invention further comprises at least one reinforcing rib 23 arranged transversal to the spars 7 at a transversal sector S1 of the structure 1, which defines a given longitudinal position (or "longitudinal coordinate") along the structure 1 itself, interposed between the first longitudinal end 1*a* and the second longitudinal end 1*b*.

In other words, the reinforcing rib 23 extends transversally to the longitudinal direction A.

The presence of the longitudinal rib 23 makes it possible to strengthen the structure 1 and increase the stability and rigidity thereof, in view of the removal of the aforesaid "center box".

Moreover, the presence of the reinforcing rib 23 makes it possible to envisage the coupling, at the transversal sector S1, of control systems (e.g., pneumatic, oleodynamic, hydraulic or electric pistons) for the tilting of the stabilizer 2 (i.e., the incidence of the semi-wing), known per se and not illustrated or described in detail. Such a configuration allows to unload part of the stresses from the aforesaid control systems onto the structure 1, and in particular onto the reinforcing rib 23, thereby improving the structural properties and resistance to stresses of the structure 1.

In accordance with the present invention, the arrangement of the spars 7 in the forming mold 11 occurs: by orienting the spars 7 in such a way that the relative spar cavities 21 all face one another transversally to the longitudinal direction A and all arranged at said first longitudinal end 1*a*; orienting the spars 7 in such a way that the lateral openings 20 of the slots 19 are arranged at said first longitudinal end 1*a*; and, in particular arranging the spars 7 in such a way that the respective axial coordinates X of the respective profiles 12 correspond with the transversal sector S1 (as illustrated in FIGS. 7 to 10).

In an alternative embodiment not illustrated, the axial coordinates X of the respective profiles 12 may not be aligned with each other along the transversal sector S1, thus resulting in slots 19 which are more or less elongated in the longitudinal direction.

Figure 7:
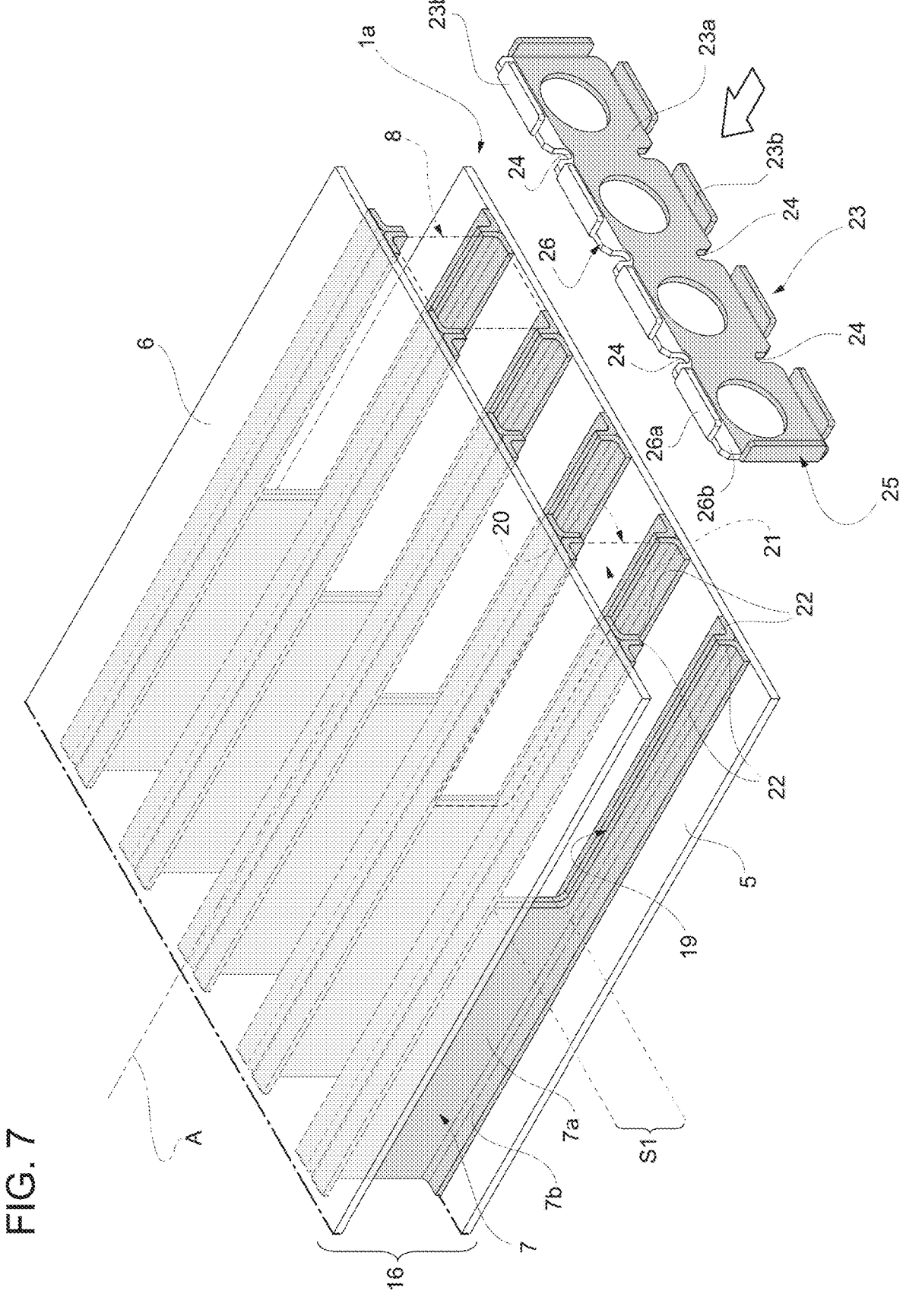
FIGS. 7 to 10 illustrate sequentially, in schematic perspective view and with parts removed for clarity, certain steps of the method according to the present invention concerning the assembly of the box-shaped structure.
Figure 8:
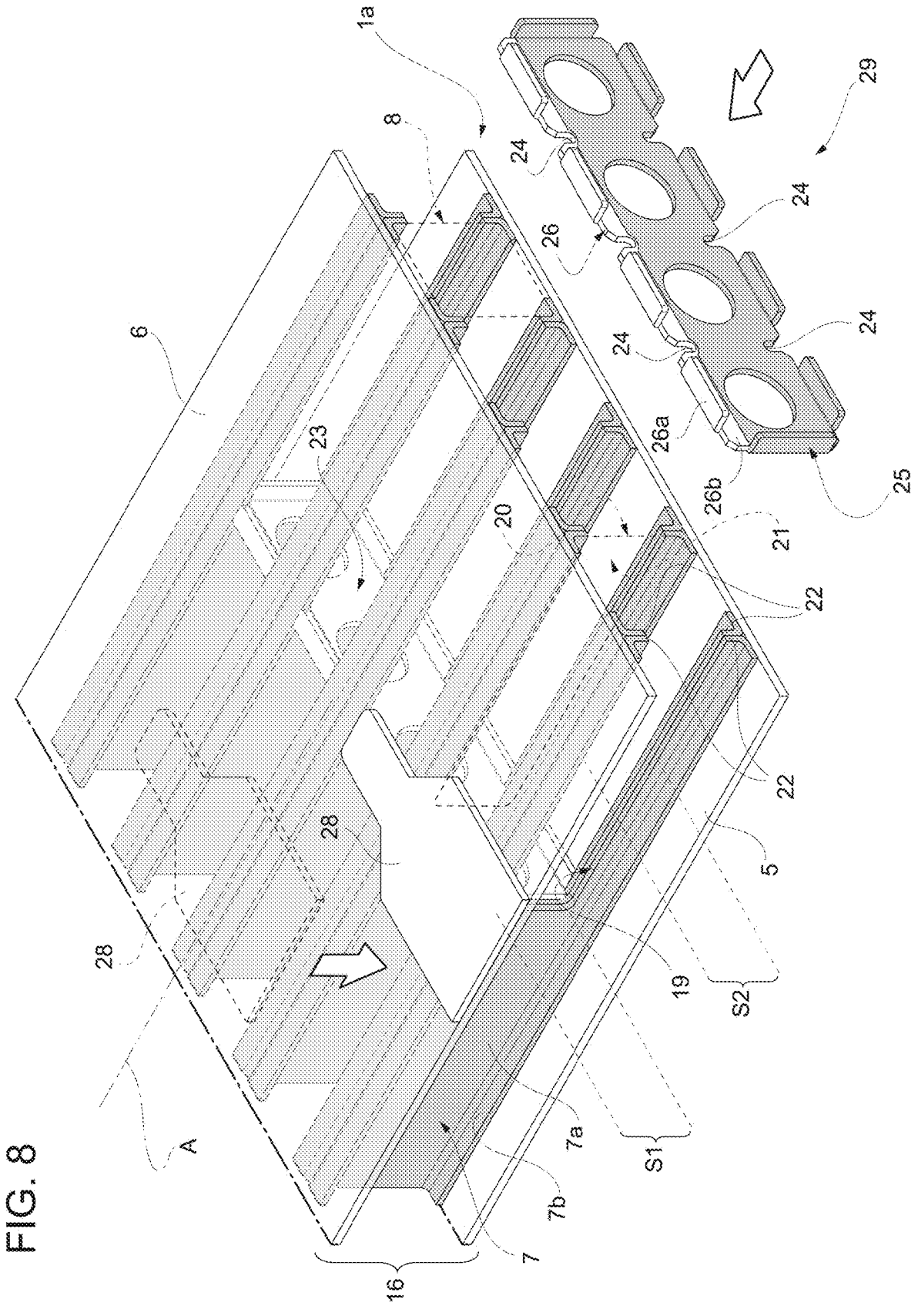

With reference to FIGS. 7 and 8, the process of implementing the reinforcing rib 23 within the structure 1 according to the present invention will now be described.

In particular, the reinforcing rib 23 is inserted transversally (with respect to the longitudinal direction A) between the lower wall 5 and the upper wall 6 through the lateral openings 20 of the slots 19, so as to engage the spar cavities 21.

Therefore, the method according to the invention comprises: inserting the reinforcing rib 23 into the first assembly 16 previously obtained starting from the first longitudinal end 1*a* and through the lateral openings 20 of the slots 19, so as to engage the spar cavities 21 (FIG. 7); and advancing the previously inserted reinforcing rib 23 inside the cavities 21 in a longitudinal direction towards the second longitudinal end 1*b* and up to the transversal sector S1 (FIG. 8).

Preferably, the insertion of reinforcing rib 23 is carried out by coupling in a sliding manner the reinforcing rib 23 to the ribs 22, while the sliding of the reinforcing rib 23 is carried out by sliding the reinforcing rib 23 itself along the ribs 22.

For this purpose, the reinforcing rib 23 includes openings 24 which can be slidingly engaged by the ribs 22, so as to define a guide-slide system.

Therefore, the reinforcing rib 23 is slidingly coupled with the ribs 22.

The presence of the ribs 22, apt to engage the openings 24, results in a greater precision in positioning, coupling and fixing the reinforcing rib 23 to the assembly 16.

Conveniently, the reinforcing rib 23 is fixed at the transversal sector S1 by rigid coupling with one among the lower wall 5 and the upper wall 6.

In particular, the reinforcing rib 23 comprises a fixing portion which is fixed to said one of the walls 5 and 6 by nailing or riveting or by some other means not explained in detail herein (e.g., by gluing using special adhesives, e.g., epoxy adhesives, preferably after having properly prepared the parts to be coupled together).

Preferably, the reinforcing rib 23 has a C-shaped cross-section and includes a central flange 23*a* and two rows of winglets 23*b* extending cantilevered from the flange 23*a* and interspersed by the openings 24.

Once the reinforcing rib 23 has been inserted, the winglets 23*b* are coplanar in contact with the walls 5 and 6, respectively, and the reinforcing rib 23 is nailed or riveted at said winglets 23*b*, which thus define the aforesaid fixing portion.

Conveniently, before carrying out the aforesaid fixing of the reinforcing rib 23 to the walls 5 and/or 6, it is possible to check and/or detect the presence of residual spaces or gaps between the coupling parts, measure such gaps and, if necessary, fill them using solid or liquid shims (e.g., a paste that solidifies after application).

Thanks to the peculiar shape of the profiles 12 and therefore of the spars 7 obtained by means of the method according to the present invention, the insertion of the reinforcing rib 23 can be carried out in a simple and easy manner (as can the aforesaid possible measurement, detection and application of shims, which is also simplified), even after having joined the spars 7 to the walls 5 and 6, and without having to resort to the use of probes to view the inside of the finished structure 1 and without the need to drill holes and/or openings in the finished structure 1. This results in considerable time savings and a substantial decrease in assembly errors, thus decreasing the quality of the assemblies and avoiding damage to the structure 1.

Advantageously, in accordance with the method according to the invention, subsequent to obtaining the first assembly 16 and prior to the insertion of the reinforcing rib 23, a curing of the first assembly 16 is carried out according to a known method not described in detail, applying predetermined temperature and pressure to the first plurality, second plurality and third plurality of composite material layers respectively laminated according to the previously described manners.

In other words, the layers forming the first assembly 16 are cured together.

The support tools 15 are preferably kept inside the mold 11 during such a curing step (FIG. 6), so as to provide support to the spars 7 to define the cavities 8 and determine the correct spacing between the first wall 5 and the second wall 6.

More precisely, during the curing step of the first assembly 16, the curing pressure is applied both inside the forming mold 11 and inside the support tools 15, the walls of which are made flexible by the passage from the rigid state to the flexible elastomeric state and are thus pushed by the curing pressure itself to adhere to the profiles 12 and to the first wall 5 and second wall 6.

Conveniently, the support tools 15 are configured to set the flexible elastomeric state at a temperature lower than the curing temperature and higher than 50° C.

In the case of the aforesaid alternative embodiment, according to which the support tools 15 are rigid and not made of a polymer which can be deformed in response to a temperature stimulus, what is known as an envelope bag is, as mentioned, made. The vacuum is therefore applied inside the envelope bag until the material of the external bag is shrunk toward the external surface of the forming mold. In this case, therefore, the curing pressure is applied by means of the tubular bags and not by means of the deformation of the support tools 15 themselves.

Once the first assembly 16 has been cured, the support tools 15 can be pulled out (removed), thus defining the aforesaid cavities 8.

The reinforcing rib 23 is made separately and can be made of metal material, e.g., aluminium, or of said prepreg composite material. In the latter case, the reinforcing rib 23 is cured separately from the first assembly 16.

Alternatively, an additional curing step can be carried out on the assembly consisting of the first assembly 16 and the reinforcing rib 23 (i.e., what is known as a "co-bonding" operation of the composite reinforcing rib 23 with the first assembly 16 is carried out).

In an embodiment, the reinforcing rib 23 is made entirely in one piece.

Advantageously, the reinforcing rib 23 is made in two separate and distinct pieces. In detail, the reinforcing rib 23 advantageously comprises a central core 25 (in grey in the figures) and a longitudinal riblet 26 (in white in the figures) projecting orthogonally in a cantilevered manner from the central core 25.

The riblet 26 is made in a separate and distinct piece from the central core 25 and is rigidly couplable to the central core 25 itself.

In accordance with the foregoing, the insertion of the reinforcing rib 23 within the first assembly 16 is advantageously carried out as follows: the riblet 26 (and only the riblet 26) is inserted into the first assembly 16 starting from the first longitudinal end 1*a* and through the lateral openings 20 of the slots 19, engaging the spar cavities 21; the riblet 26 is slid along the cavities 21 (and in particular in sliding coupling with the ribs 22 by means of the corresponding openings 24) up to the transversal sector S1; the riblet 26 is fixed at the transversal sector S1; the central core 25 is inserted into the first assembly 16 starting from the first longitudinal end 1*a* and through the lateral openings 20 of the slots 19 (and in particular in sliding engagement with the ribs 22 by means of the corresponding openings 24); the central core 25 is arranged abutting against the previously fixed riblet 26; and the central core 25 is fixed to the riblet 26 (e.g., by riveting or nailing or gluing with adhesives or a combination of the foregoing).

In the example described, the riblet 26 has an L-shaped cross-section and includes a first section 26*a* adapted to be fixed to the lower wall 5 and/or the upper wall 6, and a second section 26*b* transversal (and in particular orthogonal) to the first section 26*a* and adapted to be fixed with the central core 25.

In such a case, the central core 25 also has an L-shaped cross-section.

In more detail, the first section 26*a* comprises one of the two rows of winglets 23*b*, while the central core 25 comprises the other of the two rows of winglets 23*b*.

In accordance with the foregoing: the riblet 26 is fixed by fixing the first section 26*a* to the lower wall 5 and/or the upper wall 6; and the central core 25 is fixed to the riblet 26 by fixing the central core 25 to the second section 26*b*.

Thanks to the fact that the reinforcing rib 23 is made in two separate and distinct pieces, which can be coupled together, it is possible to adapt the transversal extension of the reinforcing rib 23 to the actual distance between the first wall 5 and the second wall 6, which distance may be different from the nominal one as it is susceptible to relatively large tolerance errors, inherent to the manufacturing in prepreg composite material. This results in limited, or no, use of fillers (shims) between the reinforcing rib 23 and the first assembly 16, thus avoiding a rather laborious, complicated and time-consuming shimming operation.

Furthermore, in the particular cases in which such a construction solution (reinforcing rib 23 in two separate and distinct pieces) is not technically and/or structurally advantageous, the reinforcing rib 23 could (as mentioned above) be made entirely in one piece. In this latter case, thanks to the peculiar shape of the spars 7 according to the present invention, the detection and/or measurement of the aforesaid gaps for the possible insertion of the shims is considerably simplified, thanks to the presence of the slots 19, the lateral openings 20 and the spar cavities 21 and the spaces ensured by such structural expedients.

Conveniently, the structure 1 further comprises an external reinforcing element 28 fixed to at least one of the lower wall 5 and the upper wall 6, for example to the upper wall 6, at the transversal sector S1, so as to overlap at least part of the underlying reinforcing rib 23.

In an embodiment, the reinforcing element 28 is made of metal material.

Preferably, the reinforcing element 28 is defined by a body with shaped plate, e.g., an aluminium sheet.

The reinforcing element 28 is preferably nailed or riveted to said one of the lower wall 5 and the upper wall 6.

In an embodiment, the reinforcing element is fixed to said one of the lower wall 5 and the upper wall 6 by some other means not detailed herein, e.g., by bonding using special adhesives, e.g., epoxy adhesives, preferably after the parts to be coupled together have been appropriately prepared.

In an embodiment, the reinforcing element 28 is made of prepreg composite material. In such a case, the reinforcing element 28 is either: cured separately and then nailed or riveted to said one of the lower wall 5 and the upper wall 6; or cured separately and then bonded by means of adhesive to said one of the lower wall 5 and the upper wall 6 by means of structural bonding. Alternatively, the reinforcing element 28 can be prepreg and made integral with said one of the lower wall 5 and the upper wall 6 by means of high-temperature (and possibly pressure) co-bonding.

The possible presence of the reinforcing element 28 improves the structural properties of the structure 1, since through it a passage occurs and a distribution of the loads and stresses exerted in use on the stabilizer 2. In detail, the reinforcing element 28 improves the structural properties of the stabilizer following the coupling, at the transversal sector S1, of the aforesaid stabilizer 2 incidence control systems.

The transversal sector S1 defines a first transversal sector of the structure 1.

Advantageously, according to a non-limiting embodiment of the present invention, the structure 1 includes at least one further reinforcing rib 29 arranged transversally to the spars 7 and at a second transversal sector S2 of the structure 1 interposed between the first transversal sector S1 and the first longitudinal end 1a.

For example, the reinforcing rib 29 is arranged midway between the reinforcing rib 23 and the first longitudinal end 1a.

Preferably, the reinforcing rib 29 is identical to the reinforcing rib 23 described above.

In an embodiment, the reinforcing rib 29 has a different thickness than the reinforcing rib 23. Thereby, the reinforcing ribs 23, 29 will be suitable for resisting the different loads to which the structure 1 is subjected along the longitudinal extension thereof.

In accordance with the above, the method according to the invention further involves, in such a case: the insertion of the reinforcing rib 29 into the first assembly 16 (already including the reinforcing rib 23 fixed at the first transversal sector S1) starting from the first longitudinal end 1a and through the lateral openings 20 of the slots 19, so as to engage the spar cavities 21; and the sliding of the reinforcing rib 29 previously inserted into the first assembly 16 within the spar cavities 21 along the longitudinal direction A towards the second longitudinal end 1b and up to the second transversal sector S2.

It should be noted that in some alternative embodiments, the structure 1 can include other reinforcing ribs arranged at as many transversal sectors, depending on the longitudinal extension of the structure 1 and, above all, on the spar cavities 21.

Appropriately, also in this case the sliding occurs by means of the sliding coupling of the reinforcing rib 29 with the ribs 22, in the same manner as described above for the reinforcing rib 23.

The presence of the further reinforcing rib 29 results in an even more pronounced improvement of the structural properties of the structure 1, following the removal of the center box and the consequent longitudinal elongation of the structure 1 itself.

Figure 9:
Figure 10:
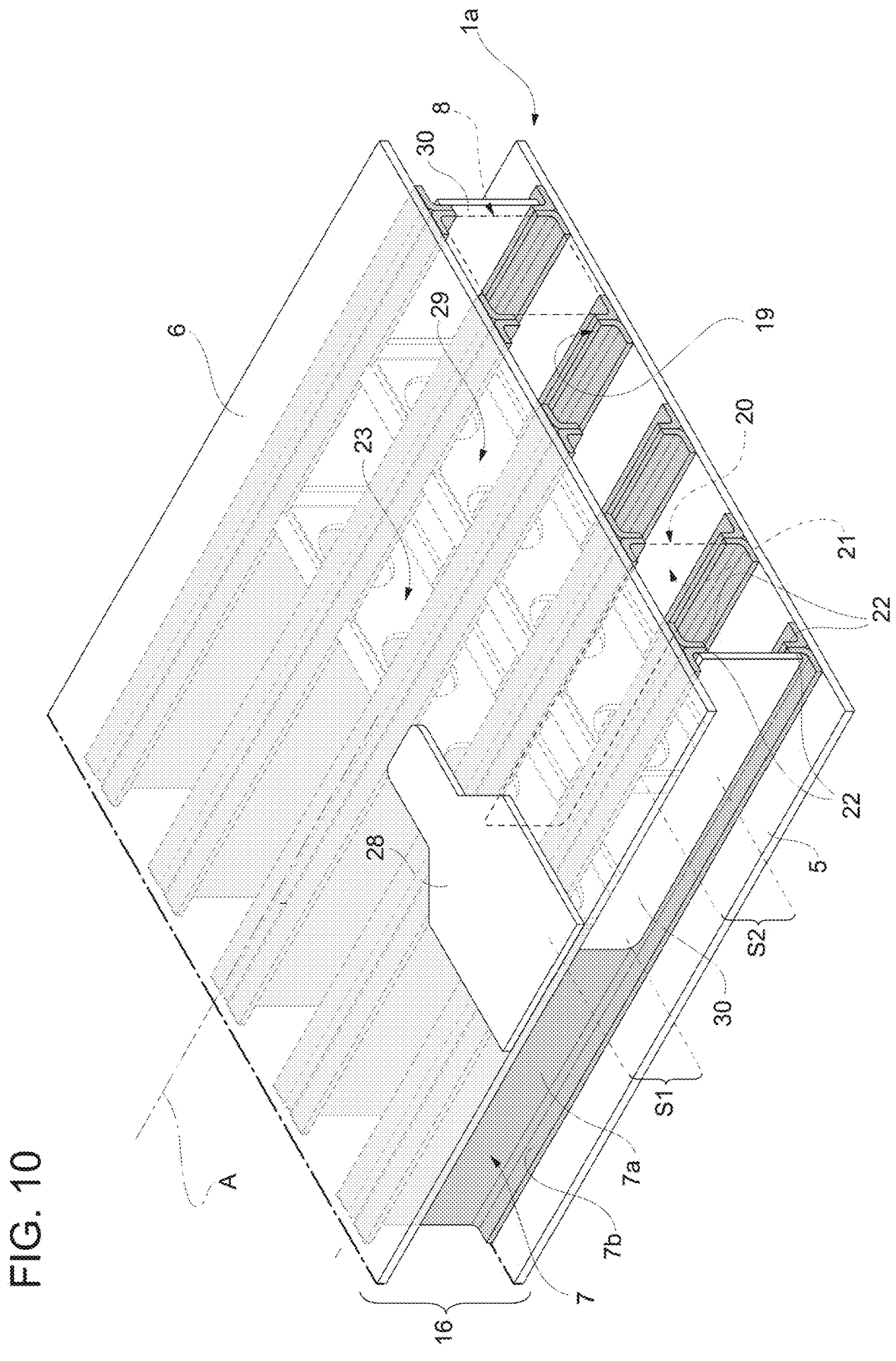

Conveniently, the structure 1 also includes two shaped elements 30 placed closing the spar cavities 21 of the outermost spars 7 (FIGS. 9 and 10).

In detail, the method according to the invention involves: subsequent to the insertion of the reinforcing rib 23, and of the reinforcing rib 29 if provided, the arrangement of at least two shaped closing elements 30 at and covering the spar cavities 21 of the outermost spars 7 of the assembly comprising the first assembly 16 and at least the reinforcing rib 23 (and possibly the reinforcing rib 29 or, if provided, additional reinforcing ribs); and the fixing of each of the shaped elements 30 to the central web 7a of the respective spar 7, at the second portion 18 of the flange 13 of the relative profile 12, so as to cover, preferably entirely, the respective spar cavity 21 and laterally close the structure 1 thus obtained.

Appropriately, each shaped element 30 has a shape complementary to that of one said slot 19.

Thanks to such an expedient, the structural continuity of structure 1 is restored, despite the presence of the slots 19 and the resulting cavities 21, which results in an improved distribution of operational loads and stresses.

In an embodiment, each shaped element 30 is made of metal material and is nailed or riveted to the respective spar 7.

In an embodiment, each shaped element 30 is made of prepreg composite material. In such a case, the shaped element 30 is alternatively: cured separately and then nailed or riveted or bonded by means of adhesive (e.g., epoxy adhesive) to the spar 7; or it is co-cured to the spar 7 by means of co-bonding.

From an examination of the characteristics of the manufacturing method of the structure 1 and of the structure 1 manufactured according to the present invention, the advantages that they allow to obtain are evident.

In particular, it is possible to obtain a box-shaped structure 1 for a stabilizer 2 of an airplane 4 including at least one reinforcing rib 23, and in particular reinforcing ribs 23, 29, and lacking the aforesaid center box in a simple and rapid manner, thus reinforcing the structure 1 and at the same time avoiding the introduction of excessive complications within the manufacturing process.

In fact, thanks to the manufacturing method according to the present invention, it is not necessary to perform complicated, costly and time-consuming detection and/or measuring processes of the inside of the finished box-shaped structure 1.

Furthermore, it is not necessary to drill holes, openings or the like in the finished structure in order to perform assembly operations in general or for the purpose of inserting detection probes and reinforcing elements or, as the latter are easily implemented in the structure 1 thanks to the particular shape of the spars 7 provided with the cavities 21 obtained in the manner described above in accordance with the present invention.

Therefore, the method according to the invention results in considerable time savings and a substantial decrease in assembly errors, thereby increasing the quality of the assemblies and avoiding damage to the structure 1. It also improves the general ergonomics of the operators involved in the manufacturing process, and thus their safety (as no additional holes and/or openings need to be drilled in the finished structure 1 and the use of tools for this purpose is not required).

Therefore, thanks to the method and the structure 1 according to the invention, the elimination of the center box and its replacement by a simple beam joint element, e.g., a relatively thin double-T profile (shown schematically in FIG. 2), is easier and more feasible, and does not introduce any structural criticality within the stabilizer 2.

In this regard, it should be noted that the assembly of such a beam joint element can easily be carried out after the insertion of the envisage reinforcing support ribs (e.g., two reinforcing ribs 23, 29 as described).

In view of the above, the structure 1 can be lengthened along the longitudinal direction A to compensate for the lack of material resulting from the removal of the center box, without however introducing excessive complications into the manufacturing process of the stabilizer 2.

Furthermore, the presence of the reinforcing rib 23 makes it possible to envisage the coupling, at the transversal sector S1, of the aforesaid control systems (e.g., pneumatic, oleo-dynamic, hydraulic or electric pistons) for the tilting of the stabilizer 2, known per se and not illustrated or described in detail. Such a configuration allows to unload part of the stresses from the aforesaid control systems onto the structure 1, and in particular onto the reinforcing rib 23, thereby improving the structural properties and resistance to stresses of the structure 1. Such a condition is further improved by the possible presence of the reinforcing element 28.

Clearly, changes may be made to the method and structure 1 as described and illustrated herein without, however, departing from the scope of protection defined by the claims.

The invention claimed is:

1. A method for manufacturing a box-shaped structure for a horizontal stabilizer for aircrafts using a fiber-reinforced polymer matrix prepreg composite material, said structure extending along a longitudinal direction between a first longitudinal end and a second longitudinal end, and comprising:
   a first longitudinal wall;
   a second longitudinal wall facing the first wall and arranged spaced from the first wall itself by a non-zero amount;

a plurality of spars extending longitudinally and between said first wall and second wall, connected to these latter and delimiting with the first wall and the second wall respective longitudinal cavities; and at least one reinforcing rib arranged transversal to the spars at a transversal sector of said box-shaped structure interposed between said first longitudinal end and second longitudinal end;

the method comprising the steps of:

a) laminating a first plurality of layers of said prepreg composite material on a first forming plate of a forming mold, so as to form a first skin of composite material defining said first wall;

b) laminating a second plurality of layers of said prepreg composite material on a second forming plate of said forming mold, so as to form a second skin of composite material defining said second wall;

c) arranging a plurality of elongated support tools each having a central axis and a cross section with a polygonal external profile complementary to the profile of the longitudinal cavities to be formed in said structure;

d) laminating a third plurality of layers of said prepreg composite material on three contiguous walls of each support tool, so as to obtain elongated profiles made of said composite material, each profile having a longitudinal axis and a C-shaped cross section, and comprising a central flange and two winglets projecting transversally from the flange;

e) joining said profiles two by two along the respective flanges adjoining side by side respective pairs of support tools so that the profiles themselves have opposite concavities, so as to obtain respective spars having a double-T cross section defined by a central web and two opposite end wings;

f) longitudinally arranging the adjoined support tools and the spars previously obtained on the first wall previously obtained in such a way that respective first wings of the spars are coplanar in contact with said first wall and in such a way that the webs of the spars are oriented along said longitudinal direction;

g) arranging said second wall on the assembly obtained in step f), in such a way that the second wall is coplanar in contact with respective second wings of the spars opposite said first wings, thus delimiting said longitudinal cavities and thus defining a first assembly of the box-shaped structure including the first wall, the second wall and the spars;

wherein the step d) of laminating the third plurality of layers comprises, for each profile:

d1) laminating the relative winglets, from one axial end of the profile to the other axial end of the profile;

d2) laminating a first portion of said flange from said one axial end up to a predetermined axial coordinate of the profile, interposed between said axial ends along the longitudinal axis of the profile itself, said first portion being substantially full in the longitudinal direction and in the transversal direction to the relative longitudinal axis and between the relative fins;

d3) laminating a second portion of said flange from said axial coordinate to said other axial end, said second portion having a through slot extending longitudinally from the axial coordinate up to said other axial end and laterally open at said other axial end by means of a relative lateral opening, so as to define a lack or void of material on the relative flange in the longitudinal direction, so that each spar obtained by means of the step e)

of joining has, in turn, on the respective web, a longitudinal spar cavity open laterally and determined by the union of the relative slots;

wherein the step f) of arranging comprises:

f1) orienting the spars in such a way that the relative spar cavities all face one another transversally to the longitudinal direction of the box-shaped structure and are all arranged at said first longitudinal end of the box-shaped structure;

f2) orienting the spars in such a way that the lateral openings of the slots (19) are arranged at said first longitudinal end (la);

and wherein the method further comprises the steps of:

h) after the step g) of arranging, inserting said reinforcing rib into said first assembly starting from said first longitudinal end and through the lateral openings of the slots, so as to engage the spar cavities;

i) advancing the reinforcing rib, previously inserted in the first assembly, inside the spar cavities in the longitudinal direction towards said second longitudinal end and up to said transversal sector.

2. The method according to claim 1, wherein the step f) of arranging further comprises:

f3) arranging the spars in such a way that said axial coordinates of the respective profiles correspond with said transversal sector.

3. The method according to claim 2, wherein the step d3) is carried out in such a way that said second portion also includes a pair of longitudinal ribs facing one another, each extending transversely in a cantilevered manner from a respective winglet and longitudinally from said axial coordinate up to said other axial end, and longitudinally delimiting the slot, so that each said spar cavity is longitudinally delimited by the respective ribs;

wherein the step h) includes:

coupling in a sliding manner the reinforcing rib to said ribs;

and wherein the step i) comprises:

sliding the reinforcing rib along the ribs.

4. The method according to claim 1, and further comprising the step of:

l) After the step g) of arranging and before the step h) of inserting, curing said first assembly by applying predetermined temperature and pressure to the first plurality, second plurality and third plurality of respectively laminated layers of composite material.

5. The method according to claim 1, and further comprising the step of:

m) after the step i) of advancing, fixing the reinforcing rib at said transversal sector by means of rigid coupling with at least one between said first wall and second wall.

6. The method according to claim 5, wherein the step m) of fixing comprises:

nailing or riveting a fastening portion of the reinforcing rib to said one of said first wall and second wall.

7. The method according to claim 1, wherein the reinforcing rib comprises a central core and at least one longitudinal riblet projecting orthogonally in a cantilevered manner from the central core, the riblet being made in a piece distinct and separate from the central core and rigidly couplable to the central core;

and wherein the step h) of inserting comprises:

h1) inserting the riblet into said first assembly starting from said first longitudinal end and through the lateral openings of the slots, engaging the spar cavities;

h2) advancing the riblet inserted along the side spar cavities up to the transversal sector;

h3) fixing the riblet at the transversal sector;

h4) inserting the central core of the reinforcing rib into said first assembly starting from said first longitudinal end and through the lateral openings of the slots;

h5) placing the central core of the reinforcing rib against the riblet previously fixed;

h6) fixing the central core to the riblet.

8. The method according to claim 7, wherein the riblet) has an L-shaped cross section and includes a first section adapted to be fixed to one of the first wall or second wall, and a second section transversal to the first section and adapted to be fixed with the central core;

wherein step h3) of fixing is performed by fixing the first section of the riblet to said one of the first wall or second wall;

and wherein the step h6) of fixing is performed by fixing the central core to the second section of the riblet.

9. The method according to claim 1, wherein said transverse sector defines a first transverse sector of the box-shaped structure;

wherein the box-shaped structure includes at least one further reinforcing rib arranged transversally to the spar) and at a second transversal sector of said box-shaped structure interposed between said first transverse sector and said first longitudinal end;

and wherein the method further comprises the steps of:

n) after said step i) of advancing, inserting said further reinforcing rib into said first assembly starting from said first longitudinal end and through the lateral openings of the slots, so as to engage the spar cavities;

o) advancing the further reinforcing rib, previously inserted in the first assembly, inside the spar cavities in longitudinal direction towards said second longitudinal end and up to said second transversal sector.

10. The method according to claim 1, and further comprising the steps of:

p) after step i) of advancing, arranging at least two shaped closing elements at, and covering, the spar cavities of the laterally outermost spar) of the assembly comprising said first assembly and said at least one reinforcing rib;

q) fixing each of said at least two shaped elements to the central web of the respective spar, at the second portion of the flange of the relative profile, so as to cover the relative spar cavity and laterally close the box-shaped structure thus obtained.

11. The method according to claim 1, wherein each said support tool extends between two axial ends and includes two shaped protuberances protruding from its own outer surface and extending over at least two opposite walls of the support tool itself starting from a given axial coordinate axially interposed between said two axial ends, up to one of said two axial ends, each protuberance having a shape complementary to said slot;

wherein, for each profile, the step d) of laminating is carried out by surrounding the edge of one of said protuberances so as to define said slot.

12. The method according to claim 4, wherein:

said support tools are internally hollow and have a composition based on reinforcing material and polymer apt to allow the transition from a rigid state to a flexible elastomeric state and vice-versa in response to a heating action and respectively to a cooling action;

said support tools are configured to set the flexible elastomeric state at a temperature lower than the curing temperature and higher than 50° C.;

the step d) is carried out by directly laminating the prepreg material constituting said third plurality of layers on the outer surface of the walls of said support tools while these latter are in their rigid state; and during step l) of curing said first assembly, the curing pressure is applied both inside the forming mold and inside the support tools, the walls of which are made flexible by the passage from the rigid state to the flexible elastomeric state and are therefore pushed by the curing pressure itself to adhere to said profiles, to said first wall and to said second wall.

13. The method according to claim 4, wherein said support tools are defined by rigid elements which are non-deformable in response to heating and cooling respectively;

wherein the method further comprises, prior to the steps d) of laminating, f) of arranging and l) of curing, the successive steps of:

r1) applying on each support tool a layer of separating agent to facilitate the subsequent extraction of the support tool itself from the respective cavity;

r2) fitting a tubular separator film onto each support tool so prepared, leaving an excess of the separator film at each end of the support tool itself for the subsequent sealing operation;

r3) wrapping a ventilation fabric on each support tool and on the outside of the tubular bag, fixing the edges with a sealant;

r4) fitting a tubular separator film onto each support tool so prepared, leaving an excess of the separator film at each end of the support tool itself for the subsequent sealing operation;

r5) sealing the ends of the tubular bag and of the tubular separator film using a sealant;

r6) applying the vacuum and waiting for the tubular separator film to tighten the entire so prepared coating on the relative support tool.

14. The method according to claim 13, and further comprising the steps of:

s1) after the step r6) of applying the vacuum, arranging in succession around the second assembly a separator film, a ventilation fabric and an outer bagging film;

s2) sealing the outer bagging film, so that the second assembly is housed inside it;

s3) applying vacuum inside the outer bagging film until the material of the outer bagging film tightens against the outer surfaces of the second assembly;

and wherein the aforementioned predetermined pressure and temperature relating to the step l) of curing are applied inside the outer bagging film and inside each said tubular bag.

* * * * *